Figures 1, 2:
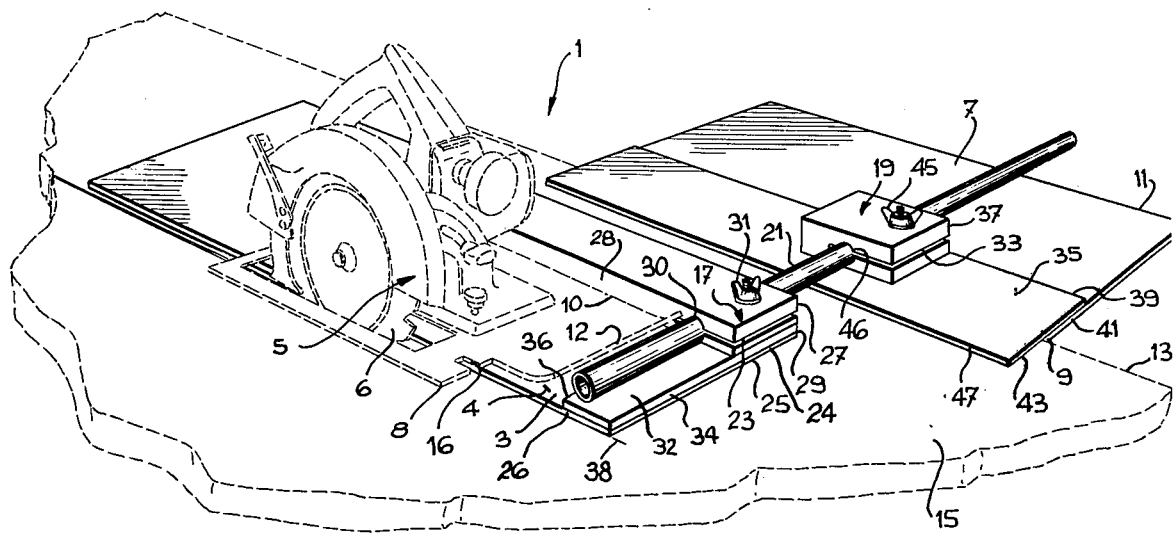

United States Patent [19]

Ong

[11] 4,128,940
[45] Dec. 12, 1978

[54] GUIDE AND ADAPTOR FOR HAND SAWS

[76] Inventor: José K. Ong, 3541 University St., Montreal, Quebec, Canada, H3A 2A9

[21] Appl. No.: 844,053

[22] Filed: Oct. 20, 1977

[51] Int. Cl.² ............................................. B27B 9/04
[52] U.S. Cl. ...................................... 30/373; 30/388; 83/745
[58] Field of Search .................. 30/373, 375, 377, 293, 30/388; 83/745

[56] References Cited

U.S. PATENT DOCUMENTS

| 3,043,351 | 7/1962 | Davis | 30/293 X |
| 3,741,063 | 6/1973 | Bretthauer | 83/745 |
| 4,016,649 | 4/1977 | Kloster | 30/373 |

*Primary Examiner*—Willie G. Abercrombie

[57] ABSTRACT

A guide and adaptor for a hand saw having a blade, the guide and adaptor being used for obtaining a straight line cut of a board in different widths, comprising a first member adapted to receive at least a part of the hand saw, a second member provided with a first edge means and a second opposite edge means, the first edge means being adapted to rest in a first predetermined position against one edge of the board, and the second edge means being adapted to rest in a second reversed predetermined position against the one edge of the board, and tubular means. A first adjustment means is provided on the first member and a second adjustment means on the second member for slidably receiving the tubular means, the first and second adjustment means adjustably positioning the second member at a predetermined distance from the first member, thus fixing the distance between the saw blade and the first edge means of the second member, the first edge means in the first predetermined position resting against the one edge of the board, yet the adjustment means permitting the reversal of the second member such as to permit the second edge means to rest against the one edge of the board at a predetermined distance from the saw blade. In the second predetermined reversed position the distance between the second edge means and the saw blade is adjustable to a smaller value than in the first predetermined position.

14 Claims, 5 Drawing Figures

U.S. Patent  Dec. 12, 1978  Sheet 1 of 3  4,128,940

GUIDE AND ADAPTOR FOR HAND SAWS

The present invention relates to a guide and adaptor for a power hand saw having a blade, this guide and adaptor being used for obtaining a straight line cut of a board in different widths.

The guide and adaptor of the present invention is particularly adapted to be used with domestic manual power hand saws and not with commercial saws.

Up to date, the only available means in obtaining a straight line cut with a powerhand saw is the rip fence. However, this rip fence has some disadvantages. They are usually made for a single product by the same particular manufacturer. They have limited width adjustment possibilities. If the longest rip fence available is, say, 14 inches, it would be useless for cutting wider than it could accommodate. Besides, once the rip fence is attached, in most cases with set screws, the free use of the saw is to some degree handicapped.

Some have found solutions in a table saw. Yet, needless to mention, the situation changes completely. A table saw is not handy as a hand saw. It also requires a great amount of working space and considerable amount of investment compared to what a hand saw requires.

The guide and adaptor of the present invention overcomes the above drawbacks.

It does not handicap the overall free use of the saw in any degree, as the saw is either not attached, or is simply snappingly attached to it. It does not require more working space than when using a hand saw without it. With a table saw, the object being cut is the moving element; this requires a large working space. With the present invention, the hand saw operates as it would have operated without it i.e. the hand saw moves on top of the object being cut.

Since some parts of the guide and adaptor of the present invention are readily available, there is pratically no cutting width limitations. One may handle the biggest jobs as well as most average jobs.

When not in use, the parts of the guide and adaptor of the present invention may be seperated for easy storage or portability. Besides, it is an economical device due to its simple construction. Any handyman can make it with his own handy tools.

Therefore, according to the present invention there is provided a guide and adaptor for a power hand saw having a blade, the guide and adaptor used for obtaining a straight line cut of a board in different widths, comprising a first member adapted to receive at least a part of the hand saw, a second member provided with a first edge means and a second opposite edge means, the first edge means being adapted to rest in a first predetermined position against one edge of the board, and the second edge means being adapted to rest in a second reversed predetermined position against the one edge of the board, and tubular means. A first adjustment means is provided on the first member and a second adjustment means on the second member for slidably receiving the tubular means, the first and second adjustment means adjustably positioning the second member at a predetermined distance from the first member, thus fixing the distance between the saw blade and the first edge means of the second member, the first edge means in the first predetermined position resting against the one edge of the board, yet the adjustment means permitting the reversal of the second member such as to permit the second edge means to rest against the one edge of the board at a predetermined distance from the saw blade. In the second predetermined reversed position the distance between the second edge means and the saw blade is adjustable to a smaller value than in the first predetermined position.

Figure 3:
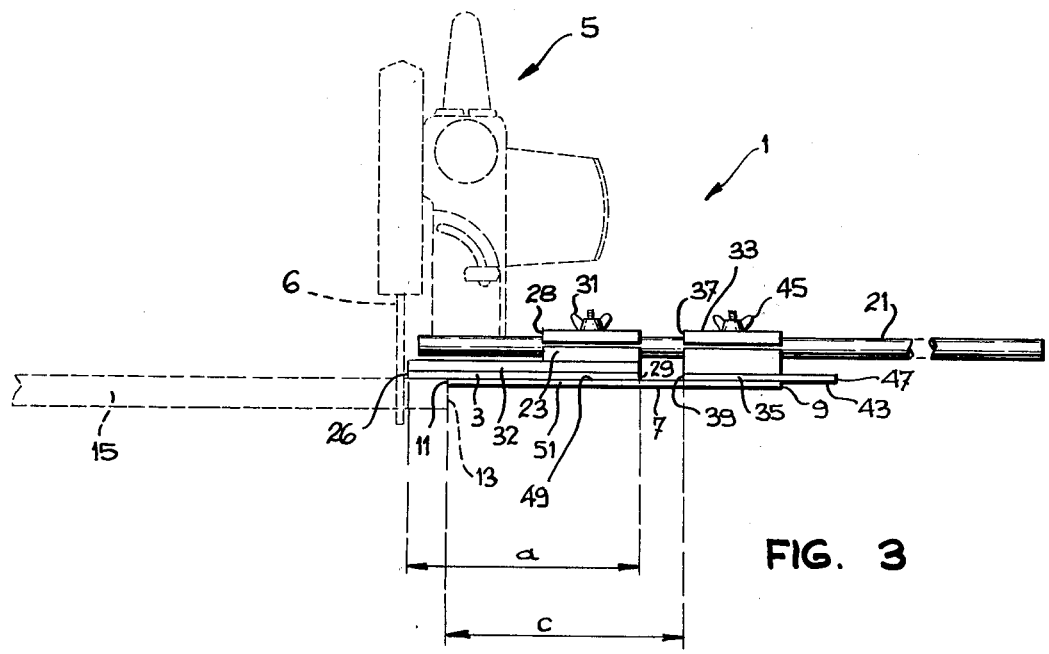
Figure 4:
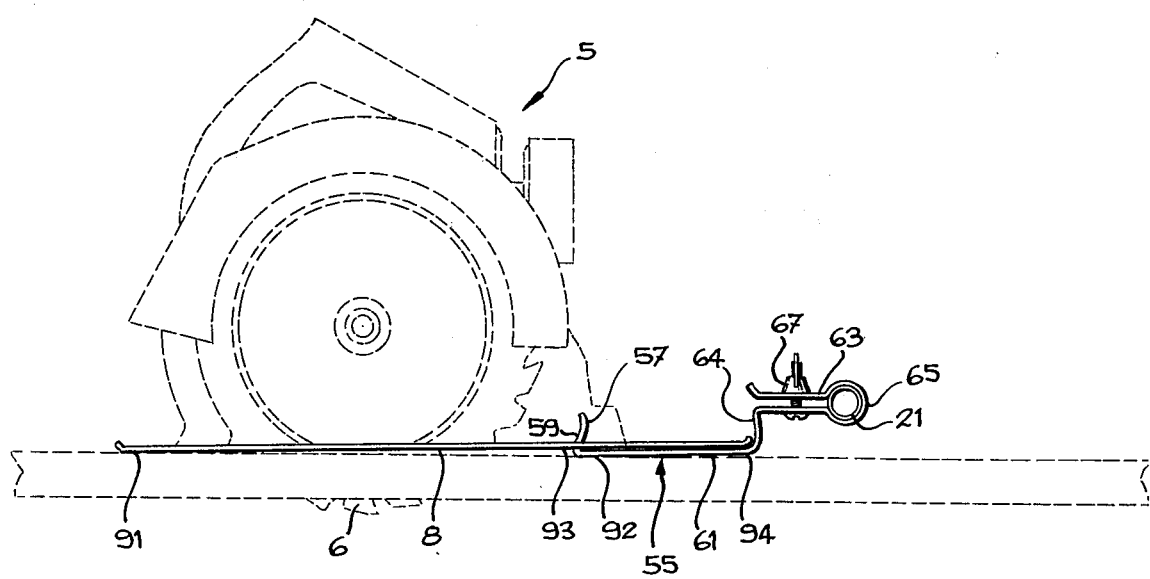
Figure 5:
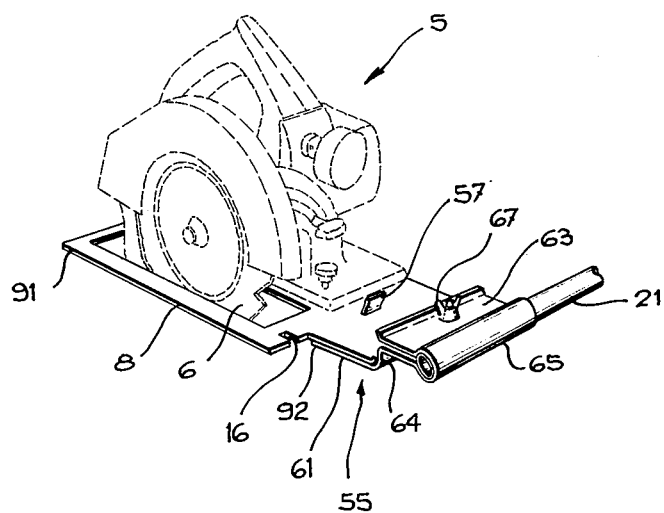

Preferred embodiments of the invention will now be described by way of examples, having reference the drawings, in which:

FIG. 1 shows a perspective view of a first embodiment of the guide and adaptor associated with a power hand saw, FIG. 2 is a front view of the guide and adaptor according to the invention, associated with a hand saw, the guide and adaptor being in a first predetermined position, FIG. 3 is a front view of the guide and adaptor according to the invention, associated with a hand saw, the guide and adaptor being in a second reversed predetermined position, FIG. 4 is a side view of a second embodiment of the guide and adaptor according to the present invention, associated with a hand saw, and, FIG. 5 is a perspective view of the second embodiment of the guide and adaptor according to the present invention.

Now, referring to the drawings, FIG. 1 shows a guide and adaptor 1 comprising a first member 3 which is a plate on the upper surface 4 of which the hand saw 5 rests, and a second member 7 which is also a plate having a first edge means 9 and a second edge means 11.

The first edge means 9 is adapted to rest in a first predetermined position, as shown in FIGS. 1 and 2, against one edge 13 of a board 15 to be cut, and the second edge means 11 is adapted to rest in a second reversed predetermined position, as shown in FIG. 3 and as it will be explained later in more detail, against the one edge 13 of the board 15.

A first adjustment means 17 is provided on the first member 3 and a second adjustment means 19 is provided on the second member 7 for slidably receiving a tubular means 21 which adjustably connect the first member 3 to the second member 7.

The first and second adjustment means 17 and 19, respectively, adjustably position the second member 7 at a predetermined distance from the first member 3 and thus fix the distance between the saw blade 6 and the first edge means 9 of the second member 7 or the distance between the saw blade 6 and the second edge means 11 when the second member 7 is in its reversed predetermined position as will be explained later.

The first adjustment means 17 of the first member 3 comprises a first slitted element 23 fixed at one lateral edge portion 25 of the first member 3. The element 23 has its one lateral side 27 flush with one lateral edge 29 of the first member 3 and is provided with a hole 30 for slidably receiving the tubular means 21. A wing nut 31 on the first slitted element 23 tightly clamps the tubular means 21 inside the hole 30 in a predetermined position.

A stop or abuting means 32 consisting of a plate is provided at the front transverse edge portion of the first member 3. The stop means 32 has one transverse side 34 flush with one transverse edge 24 of the first member 3.

The first adjustment member 17 extends along the entire length of the first member 3 and forms a straight angle with stop means 32. The other lateral side 28 of first slitted element 23 and the second transverse side 36 of the stop means 32 are adapted to accommodate the two adjacent edges 10 and 12, lateral and transversal, respectively, of the base 8 of the saw.

The second adjustment means 19 comprises a second slitted element 33 fixed on an elongated narrow strip 35 and has one of its lateral side 37 flush with one lateral edge 39 of the strip 35. The strip 35 is itself fixed at one edge portion 41 of the second member 7 in such a way that a portion 43 of the strip 35 cantilevers the edge 9 of the edge portion 41 of the second member 7. Edge 9 of the edge portion 41 of the second member 7 from which cantilevers the strip 35 forms the first edge means 9 adapted to rest against the edge 13 of the board 15 in the first predetermined position of the second member 7.

The edge 11 of the second member 7 opposite edge 9 forms the second edge means 11 which rest against the edge 13 of the board 15 in the second reversed predetermined position of the second member 7 as will be explained later.

A wing nut 45 is provided on the second slitted element 33 in order to tightly clamp, in any predetermined position, the tubular means 21 which is slidably received inside a hole 46 provided in the second slitted element.

The mode of operation of the guide and adaptor is as follows.

First, the desired width is marked from edge 13 of a board 15 to a mark 38 as shown in FIG. 1. Afterwards, the guide and adaptor 1 along with the tubular means 21 is placed on the boards 15 with the wing nuts 31 and 45 in loose condition. In the first predetermined position the edge means 9 is placed against edge 13 of the board 15 (in the second reversed predetermined position it is edge means 11 which rest against edge 13 of the board 15). In this position, wing nut 45 is tightened, allowing enough portion of the tubular means 21 left free for receiving the first member 3. Then, the second lateral edge 26 of the first member 3 opposite lateral edge 29 is placed against line 38 fixing the width of the board 15 and the wing nut 31 is tightened. Since the saw blade 6 runs along edge 26 of first member 3 the desired width of cut is the distance from edge 26 to edge means 9 or edge means 11 in the second reversed predetermined position. In other words, the width of portion of the first member 3 from side 28 of element 23 to edge 26 equals the width of the portion of the saw base 8 from edge 10 to the saw blade 6 or to the guide slot 16. The guide and adaptor 1 is then positioned so that the front portion of edge means 9 (or edge means 11 in the reversed second predetermined position) abuts against edge 13 of the board, while the rear part of first member 3 overlaps board 15. Then, the saw is slided onto member 3 from the very rear end of member 3, maintaining edge 10 of base 8 in abutment against side 28 of element 23 while sawing the board. When edge 12 of base 8 reaches second transverse side 36 of stop means 32 it pushes the guide and adaptor 1 forward. The operator uses both hands to maintain total balance.

The overlapping length of the first member 3 with respect to the base 8 of the saw contributes to the maintenance of balance of the guide and adaptor at the begining and the end of the cutting operation.

It is to be noted that in the first predetermined position of the second member 7, the minimum width for cutting a board is equal to the width a of the first member 3 plus the width b of the cantilever portion 43 of the second member 7. In fact, when lateral edge 47 of the strip 35, opposite edge 39, abuts against edge 29 of the first member 3, the second member 7 cannot move nearer to the first member 3 due to the fact that strip 35 prevents the further displacement of second member 7. In this first predetermined position the bottom surface of the cantilever portion 43 is flush with the bottom surface 51 of the first member 3.

If it is desired to cut the board 15 in a width smaller than the width obtained with the above-mentioned first position of the second member 7 with respect to the first member 3, the second member 7 is withdrawn out of the tubular member 21, is reversed and is re-engaged with tubular means 21 in such a way that edge 11 now faces the cutting blade 6 as shown in FIG. 3. In this position, second member 7 has its upper surface 49 flush with or slightly below the level of the bottom surface 51 of the first member 3. Thus, it is possible to adjust the second member 7 with respect to the first member 3 in such a way that the bottom surface 51 of the first member 3 sits on the upper surface 49 of the second member 7 so as to obtain a width which virtually equals 0. This is due to the fact that the second member 7 has a distance c, from edge 39 of strip 35 to edge means 11, which is equal to the width a of the first member 3.

The first embodiment shown in FIGS. 1, 2 and 3 is applicable to most power hand saws which could be accommodated on the upper surface 4 of the first member 3. The idea is that in mass production, the guide and adaptor of the present invention is made to accommodate the possible biggest saw.

The second embodiment shown in FIGS. 4 and 5 is particularly conceived for hand saws having means for snappingly receiving the first member 3 of the guide and adaptor. To this effect in the second embodiment, the first member 3 is replaced by an attachment 55 having hook means 57 adapted to be snappingly inserted inside a slot 59 on the base 8 of the hand saw 5. The attachment 55 comprises a rear part 61 provided with the hook means 57 and a forward part 63 which is raised with respect to the rear part 61. In between the rear part 61 and the front part 63 is a slightly bent-in side means 64 facing hook means 57. The front part 63 is folded so to form a tubular portion 65 adapted to receive the tubular means 21. A wing nut 67 permits the tightening of the tubular means 21 at any desired position. Hook means 57 and side means 64 produce a gripping effect, thus clamping attachment 55 to saw base 8 by engaging with a slot 59 and front edge of base 8 respectively.

In actual operation, only the rear area 91 of the base 8 and the rear area 92 of the attachment 55 glides on the board 15; thus leaving a stretch of space underneath base 8 from about area 91 to about area 93; and underneath the attachment 55 from about area 92 to about area 94.

In the operation with the first member 3 in its second embodiment, the guiding slot 16 of base 8 is placed against mark line 38 before wing nut 67 is tightened.

The embodiments of the invention in which an exclusive property or privilege is claimed are defined as follows:

1. A guide and adaptor for a power hand saw having a blade, said guide and adaptor used for obtaining a straight line cut of a board in different widths, comprising:

a first member adapted to receive at least a part of said hand saw, a second member provided with a first edge means and a second opposite edge means, said first edge means being adapted to rest in a first predetermined position against one edge of said board, and said second edge means being adapted to rest in a second reversed predetermined position against said one edge of said board, tubular means a first adjustment means on said first member and a second adjustment means on said second member for slidably receiving said tubular means, said first and second adjustment means adjustably positioning said second member at a predetermined distance from said first member, thus fixing the distance between the saw blade and said first edge means of said second member, said first edge means in said first predetermined position resting against said one edge of said board, yet said adjustment means permitting the reversal of said second member such as to permit said second edge means to rest against said one edge of said board at a predetermined distance from said saw blade, in said second predetermined reversed position the distance between said second edge means and said saw blade being adjustable to a smaller value than in said first predetermined position.

2. A guide and adaptor according to claim 1, wherein said first member is a plate and said hand saw has a base which sits on said plate.

3. A guide and adaptor according to claim 1, wherein said first member comprises an attachment having hook means and said hand saw has a base provided with a slot, the hook means snappingly engaging said slot when at least a part of said hand saw is received on said attachment.

4. A guide and adaptor according to claim 2, wherein said second member is a plate.

5. A guide and adaptor according to claim 4, wherein said first adjustment means is a first slitted element fixed at one lateral edge portion of said first member and has one lateral side flush with one lateral edge of said first member, said first adjustment element having a hole for slidably receiving said tubular means and a wing nut for tightly maintaining said tubular means in a predetermined position, and wherein said second adjustment means is a second slitted element fixed on an elongated narrow strip and has one lateral side flush with one lateral edge of said strip, said strip being fixed at one edge portion of said second member in such a way that a portion of said strip cantilevers the edge of said edge portion of said second member to which is fixed said strip, said edge of said edge portion of said second member forming said first edge means, said second member having another edge opposite said one edge which forms said second edge means, said second adjustment element being provided with a hole for slidably receiving said tubular means and a wing nut for tightly maintaining said tubular means in a predetermined position.

6. A guide and adaptor for a hand saw according to claim 3, wherein said attachment comprises a rear part provided with said hook means and a forward part which is raised with respect to the rear part and is folded over in such a way as to form a tubular portion for receiving said tubular means, a wing nut permitting the tightening of the tubular means in said hole at any desired position.

7. A guide and adaptor according to claim 5, wherein said hole of said first adjustment element and said hole of said second adjustment element are aligned in such a way that in said first predetermined position when the tubular means is clamped in said first and second adjustment elements the bottom surface of said cantilever portion is flush with the bottom surface of said first member.

8. A guide and adaptor according to claim 5, wherein said hole of said first adjustment element and said hole of said second adjustment element are aligned in such a way that in said second predetermined position when said tubular means is clamped in said first and second adjustment elements, the bottom surface of said first member sits on the upper surface of said second member.

9. A guide and adaptor according to claim 8, wherein the first member has a width which is equal to the distance of the second member from said another edge to said one lateral edge of said strip.

10. A guide and adaptor according to claim 7, wherein said cantilever portion has a width and wherein in said first predetermined position the minimum width for cutting a board which is possible to obtain equals to the width of said first member plus the width of said cantilever portion.

11. A guide and adaptor according to claim 9, wherein in said second predetermined position, said another edge of said second member abuts against the edge of the board to be cut, the distance between the saw blade and said another edge of the second member being adapted to be fixed virtually to zero.

12. A guide and adaptor according to claim 11, wherein in said second predetermined position the upper surface of the second member is flush with or slightly below the level of the bottom surface of the first member in such a way that said first member is adapted to sit on said second member.

13. A guide and adaptor according to claim 6 wherein when said attachment is snappingly fixed to said base of the saw so that only a rear area of the base and a rear area of the attachment glide on the board.

14. A guide and adaptor according to claim 4, further comprising a stop means having one transverse side flush with one transverse edge of the first member and a second transverse side against which a transverse edge of the base of the saw is pushed so as to move said guide and adaptor forward.

* * * * *